(12) United States Patent
Taylor et al.

(10) Patent No.: US 9,765,176 B2
(45) Date of Patent: Sep. 19, 2017

(54) POLY(ETHER KETONE) POLYMERS COMPRISING CYCLOALIPHATIC UNITS

(71) Applicant: SOLVAY SPECIALTY POLYMERS USA, LLC, Alpharetta, GA (US)

(72) Inventors: Narmandakh Taylor, Cumming, GA (US); DeeDee Smith, Dacula, GA (US); David Blake Roller, Norcross, GA (US)

(73) Assignee: Solvay Specialty Polymers USA, LLC, Alpharetta, GA (US)

( * ) Notice: Subject to any disclaimer, the term of this patent is extended or adjusted under 35 U.S.C. 154(b) by 0 days.

(21) Appl. No.: 14/653,645

(22) PCT Filed: Dec. 19, 2013

(86) PCT No.: PCT/EP2013/077511
§ 371 (c)(1),
(2) Date: Jun. 18, 2015

(87) PCT Pub. No.: WO2014/096269
PCT Pub. Date: Jun. 26, 2014

(65) Prior Publication Data
US 2015/0344610 A1   Dec. 3, 2015

Related U.S. Application Data

(60) Provisional application No. 61/740,372, filed on Dec. 20, 2012.

(30) Foreign Application Priority Data

May 14, 2013 (EP) ..................................... 13167697

(51) Int. Cl.
*C08G 10/00* (2006.01)
*C08G 8/02* (2006.01)
*C08G 65/34* (2006.01)
*C08G 65/40* (2006.01)

(52) U.S. Cl.
CPC ............... *C08G 10/00* (2013.01); *C08G 8/02* (2013.01); *C08G 65/34* (2013.01); *C08G 65/4012* (2013.01)

(58) Field of Classification Search
CPC .......... C08G 8/02; C08G 10/00; C08G 65/34; C08G 65/4012
USPC ......................................... 528/174, 219, 222
See application file for complete search history.

(56) References Cited

U.S. PATENT DOCUMENTS

| 5,955,565 A | 9/1999 | Morris et al. |
| 2011/0223525 A1 | 9/2011 | Sacripante et al. |

FOREIGN PATENT DOCUMENTS

| CA | 2041885 A1 | 11/1991 |
| DE | 4016711 A1 | 11/1991 |
| EP | 0456608 A2 | 11/1991 |
| JP | 63092644 A | 4/1988 |
| JP | 63297423 A | 12/1988 |
| JP | 01292031 A | 11/1989 |
| JP | 02247155 A | 10/1990 |

*Primary Examiner* — Edward Cain
(74) *Attorney, Agent, or Firm* — Jarrod N. Raphael; Nikhil Patel

(57) ABSTRACT

A poly(ether ketone) polymer comprising recurring units derived from the reaction of at least one aromatic dihalo-compound comprising at least one —C(O)— group and at least one diol having a general formula HO-$D_{ol}$-OH wherein $D_{ol}$ is an aliphatic group comprising from 4 to 20 carbon atoms which comprises at least one cycloaliphatic moiety.

14 Claims, No Drawings

POLY(ETHER KETONE) POLYMERS COMPRISING CYCLOALIPHATIC UNITS

This application claims priority to U.S. provisional application No. 61/740,372 filed on Dec. 20, 2012 and to European application No. 13167697.5 filed on May 14, 2013, the whole content of each of these applications being incorporated herein by reference for all purposes.

TECHNICAL FIELD

The invention relates to poly(ether ketone) polymers comprising monomeric units comprising certain cycloaliphatic moieties and to manufacturing methods for their preparation. The invention further relates to compositions containing such polymers and articles made therefrom.

BACKGROUND ART

High performance plastics, in particular poly(ether ketone) polymers, due to their attractive properties, are currently used for the manufacture of several parts and articles as replacement for materials like metals, alloys and the like. Poly(ether ether ketone) (PEEK), for instance, is well known as an ultra-performance polymer. It is a semi-crystalline, highly chemically resistant, fatigue resistant and dimensionally stable material at high temperatures.

In the design and synthesis of high performance plastics, rigid aromatic groups are typically used to impart attributes such as thermal stability and mechanical strength. The rigidity of these groups contributes to high glass transition temperatures and/or melting points and also provides the thermal stability needed for processing at increased temperature. While rigid aromatic groups provide for increased thermal and mechanical performance, the trade-off is usually a decrease in the UV and photo-oxidative stability of the resultant polymers. In the past, incorporation of aliphatic monomers into high performance polymers has been used to increase UV/photo-oxidative stability. Unfortunately, addition of aliphatic monomers generally leads to a decrease in other attributes.

It has now been found that poly(ether ketone) polymers comprising monomeric units derived from aliphatic diols comprising cycloaliphatic units, in particular from 2,2,4,4-tetramethyl-1,3-cyclobutanediol (CBDO), are still characterised by a good balance of properties required by high performance plastics, such as high glass transition temperatures and/or melting temperatures without suffering from the UV and photo-oxidative limitations of polymers containing monomeric units comprising rigid aromatic groups only.

DESCRIPTION OF THE INVENTION

A first object of the invention is directed to a poly(ether ketone) polymer comprising recurring units of formula (PEK-1):

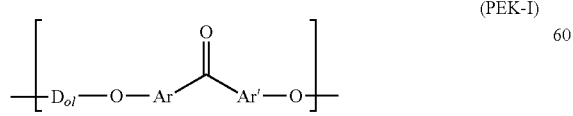

(PEK-I)

wherein:
$D_{ol}$ is selected from the group consisting of formulae (Dol-1), (Dol-2), (Dol-3), (Dol-4) and (Dol-5):

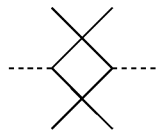

Dol-1

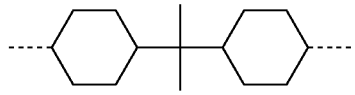

Dol-2

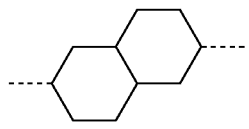

Dol-3

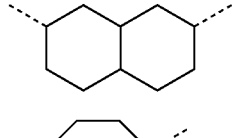

Dol-4

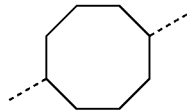

Dol-5

Ar and Ar' are aromatic moieties, independently selected from the group consisting of formulae (Ar-1), (Ar-2), (Ar-3), (Ar-4) and (Ar-5):

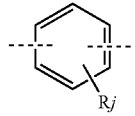

Ar-1

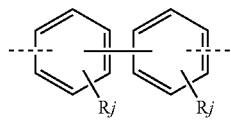

Ar-2

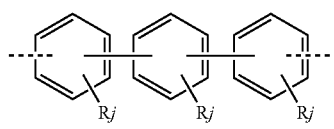

Ar-3

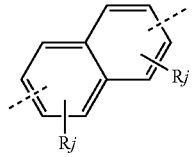

Ar-4

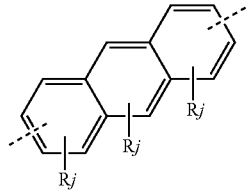

Ar-5 wherein each R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j is zero or is an integer from 0 to 4.

Preferably, in formulae (Ar-1) to (Ar-5), j is at each occurrence zero, that is to say that the phenylene moieties have no other substituents than those enabling linkage in the main chain of the polymer.

In formulae (Ar-1) to (Ar-5), the respective phenylene moieties may independently have 1,2-, 1,4- or 1,3-linkages to the other moieties different from R in the recurring unit. Preferably, said phenylene moieties have 1,3- or 1,4-linkages, more preferably they have 1,4-linkage.

Preferably, aromatic moieties Ar and Ar' are each independently selected from the group consisting of formulae (Ar-1), (Ar-2) and (Ar-3). More preferably, at least one of aromatic moieties Ar and Ar' is of formula (Ar-1).

In the formula (PEK-I), the $D_{ol}$ is preferably selected from the group consisting of formulae (Dol-1) and (Dol-2).

The poly(ether ketone) polymer of the present invention comprises advantageously recurring units selected from the group consisting of recurring units of formulae (i) to (vi), and mixtures thereof:

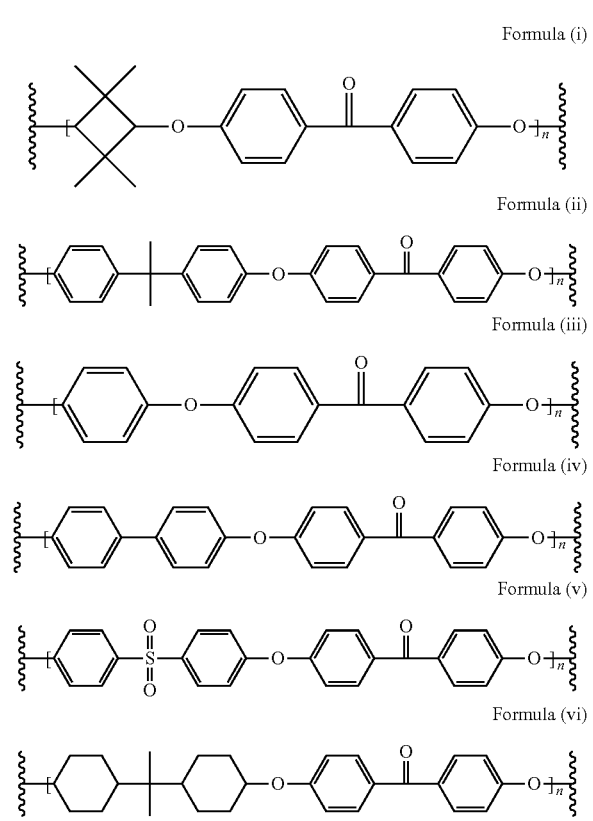

More preferably, the poly(ether ketone) polymer of the present invention comprises recurring units of formulae (i) and/or (vi). Excellent results were obtained when the poly(ether ketone) polymer of the present invention consisted essentially of recurring units of formula (i).

The poly(ether ketone) polymer of the present invention comprises advantageously recurring units derived from the reaction of at least one diol of general formula (I):

HO-$D_{ol}$-OH        (I)

which is selected from the group consisting of diols of formulae (D-1) to (D-5):

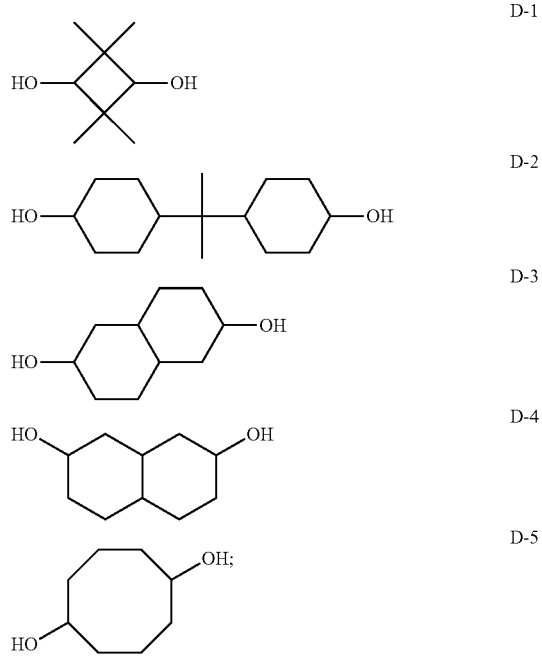

and at least one aromatic dihalocompound of general formula (II):

wherein the Ar and Ar' are aromatic moieties as defined above; and X and X', equal to or different from each other, are independently a halogen atom.

Diols according to formulae (D-1) to (D-5) may exist in different stereochemical arrangements. For the sake of simplicity the stereochemistry of the bonds, in particular the stereochemical arrangement of the C—OH or C—CH$_2$OH bonds in formulae (D-1) to (D-5), is not indicated in the present specification. It has to be understood that all stereoisomers, each one singly as well as their mixtures, are encompassed by each formula (D-1) to (D-5). Thus, in the case of 2,2,4,4-tetramethyl-1,3-cyclobutanediol (CBDO), formula (D-1) encompasses the cis isomer, the trans isomer, as well as their mixtures in any proportion.

Preferably, the diol of formula (I) is selected from the group consisting of formulae (D-1), (D-2) and (D-5). More preferably the diol of formula (I) is selected from the group consisting of formulae (D-1) and (D-2). Most preferably, the diol of formula (I) is 2,2,4,4-tetramethyl-1,3-cyclobutanediol (formula (D-1)).

Preferably, X and X' in formula (II), equal to or different from each other, are independently selected from —Cl or —F. More preferably X and X' are —F.

Preferred aromatic dihalocompounds are difluoro-, chlorofluoro- and dichloro-compounds. Particularly preferred aromatic dihalocompounds are selected from the group consisting of 4,4'-difluorobenzophenone, 4,4'-dichlorobenzophenone and 4-chloro-4'-fluorobenzophenone, with 4,4'-difluorobenzophenone being more particularly preferred.

The recurring units deriving from the diol of formula (I) and the aromatic dihalocompound of formula (II) represent preferably at least 40 mol %, more preferably at least 50 mol % of the total amount of recurring units of the the poly(ether ketone) polymer.

In a first embodiment of the present invention, the poly(ether ketone) polymer consists of recurring units having general formula (PEK-1), as detailed above. End chains, defects and minor constituent can be present into the microstructure of this poly(ether ketone) polymer without substantially modifying its properties, typically in an amount not exceeding 5 wt %, based on the total weight of the poly(ether ketone) polymer.

In an alternative embodiment, the poly(ether ketone) polymer comprises recurring units different from those of formula (PEK-1). Typically, in such embodiment, the poly(ether ketone) polymer comprises from 40 mol % to 99 mol % of recurring units having general formula (PEK-1). Preferably, the poly(ether ketone) polymer comprises at least 50 mol % of recurring units having general formula (PEK-1). Typically the poly(ether ketone) polymer comprises up to 95 mol %, preferably up to 90 mol % of recurring units having general formula (PEK-1). The recurring units different from those of formula (PEK-1), may be derived from the reaction with at least one diol of formula (III):

HO-AD$_{ol}$-OH  (III)

and be represented by formula (PEK-II):

(PEK-II)

wherein Ar and Ar' are aromatic moieties as defined above and ADol is an aliphatic or aromatic group comprising from 4 to 30 carbon atoms, optionally comprising heteroatoms, which is different from Dol. Typically, ADol comprises aromatic moieties. Preferably, ADol comprises aromatic moieties having from 6 to 20 carbon atoms.

Notable, non-limiting examples of suitable groups ADol comprising aromatic moieties are those selected from the group consisting of formulae (ADol-1) to (ADol-6), here below:

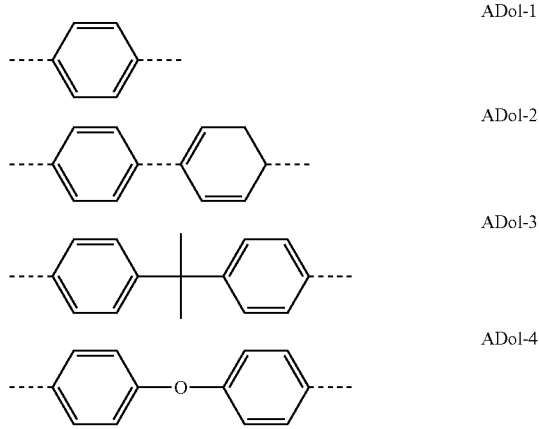

ADol-1

ADol-2

ADol-3

ADol-4

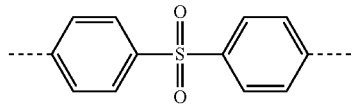

ADol-5

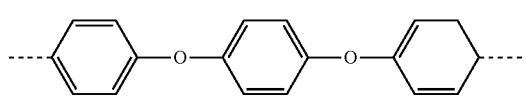

ADol-6

Alternatively, the recurring units different from those of formula (PEK-I), may be derived from the reaction of a diol of formula (I) with at least one dihalocompound of formula (IV):

(IV)

wherein A and A' are aliphatic or aromatic groups, different from Ar and Ar', having from 4 to 30 carbon atoms, optionally comprising heteroatoms; and X and X', equal to or different from each other, are independently a halogen atom; and be represented by formula (PEK-III):

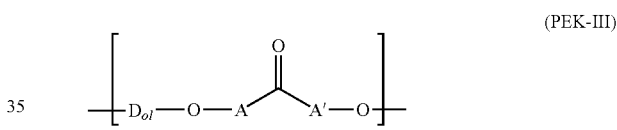

(PEK-III)

wherein D$_{ol}$ is as defined above for formula (I).

Typically, A and A' each independently comprise aromatic moieties having from 6 to 30 carbon atoms different from Ar and Ar'.

In a particular embodiment, the poly(ether ketone) polymer comprises in addition to recurring units of formula (PEK-I) at least recurring units of formula (PEK-II).

Excellent results were obtained for example when the poly(ether ketone) polymer of the present invention comprised a combination of recurring units of formula (i) and of recurring units selected from the group consisting of recurring units of formulae (ii) to (vi), namely when the poly(ether ketone) polymer of the present invention comprised recurring units of formula (i) and of formula (ii), or when it comprised recurring units of formula (i) and of formula (iii), or when it comprised recurring units of formula (i) and of formula (iv), or when it comprised recurring units of formula (i) and of formula (v), or when it comprised recurring units of formula (i) and of formula (vi).

Typically the recurring units of formula (PEK-II) are present in an amount of at least 5 mol % and up to 60 mol %, preferably up to 50 mol % of the total recurring units in the poly(ether ketone) polymer.

The poly(ether ketone) of the invention is characterized by a molecular weight (weight average molecular weight, $M_w$) of at least 1,000, even of at least 5,000, preferably of at least 10,000, more preferably of at least 20,000, and even more preferably of at least 30,000. The molecular weight $M_w$ may be of at most 200,000, typically at most 150,000 or at most 120,000.

The molecular weight $M_w$ typically does not exceed 1,000,000, it does not exceed 500,000, even it does not exceed 400,000.

The poly(ether ketone) of the invention is generally characterized by a polydispersity, that is the ratio $M_w/M_n$ of from 1.5 to 3.2, typically from 1.8 to 3.0, even from 1.8 to 2.5. The weight average molecular weight ($M_w$) and the number average molecular weight ($M_n$) can be estimated by gel-permeation chromatography (GPC) calibrated with polystyrene standards.

The poly(ether ketone) polymer of the present invention may be a semi-crystalline polymer or an amorphous polymer depending on its composition.

Semi-crystalline poly(ether ketone) polymers of the invention may typically have glass transition temperatures of at least 140° C., preferably at least 150° C. and melting temperatures generally greater than 200° C.

Amorphous poly(ether ketone) polymers of the invention typically have a glass transition temperature of at least 140° C., more typically of at least 150° C. and up to 200° C. Glass transition temperature ($T_g$) and melting temperature ($T_m$) are generally determined by DSC, according to ASTM D3418.

The poly(ether ketone) polymer of the present invention may be made by a polycondensation reaction from at least one an aromatic dihalocompound comprising at least one —C(O)— group and at least one diol having general formula (I), as detailed above. The polycondensation reaction can be carried out according to known methods.

Another object of the present invention is thus a process for manufacturing the poly(ether ketone) polymer.

In a first embodiment the process of the invention advantageously comprises reacting in a solvent mixture comprising an aprotic solvent:
  at least one alkali metal salt of a diol of formula (I); and
  at least one aromatic dihalocompound of formula (II), said alkali metal salt of a diol and said aromatic dihalocompound being reacted in substantially equimolar amount.

The process may comprise additionally reacting in said solvent mixture of:
  at least one alkali metal salt of a diol of formula (III) different from diol of formula (I); and/or
  at least one dihalocompound of formula (IV) different from the aromatic dihalocompound of formula (II), as above detailed;
when the process is intended to manufacture a poly(ether ketone) polymer comprising recurring units different from those of formula (PEK-I), being understood that the overall amount of halo-groups and salified hydroxyl-groups is then substantially equimolar.

Generally, after an initial heat up period, the temperature of the reaction mixture is maintained in a range of advantageously from 80-200° C., preferably from 120 to 180° C. for about 0.5 to 30 hours, typically 5 to 20 hours.

The alkali metal salt of the diol of formula (I) and, when present of formula (III), may be prepared in a separate step which comprises reacting the diol with an alkali metal hydroxide in a solvent mixture comprising at least on polar aprotic solvent. The alkali metal hydroxide is typically selected from NaOH and KOH, preferably NaOH.

The amount of the alkali metal hydroxide, when expressed by the ratio of the equivalents of alkali metal (M) per equivalent of hydroxyl group (OH) [eq. (M)/eq. (OH)] ranges from about 1.0 to about 3.0, preferably from about 1.1 to about 2.5, and more preferably from about 1.5 to about 2.0, being understood that above mentioned hydroxyl group equivalents are comprehensive of those of the diol of formula (I), and, if present, of diol of formula (III).

The reaction of the diol with the alkali metal salt is preferably carried out by slowly raising the temperature to the final reaction temperature, which is typically between 120 and 180° C.

In a second embodiment, the process of the invention advantageously comprises reacting in a solvent mixture comprising a polar aprotic solvent:
  at least one diol of formula (I); and
  at least one aromatic dihalocompound of formula (II), said diol and said aromatic dihalocompound being reacted in substantially equimolar amount, in the presence of an alkali metal carbonate.

The process may comprise additionally reacting in said solvent mixture at least one of:
  one diol of formula (II) different from diol of formula (I); and/or
  one dihalocompound of formula (IV) different from the aromatic dihalocompound of formula (II), as above detailed;
when the process is intended to manufacture a poly(ether ketone) polymer comprising recurring units different from those of formula (PEK-I), being understood that the overall amount of halo-groups and hydroxyl-groups is then substantially equimolar.

In both embodiments of the process, the expression 'substantially equimolar' used with reference to the ratio between diol and dihalocompound, as above detailed, is to be understood by the fact that the molar ratio between the overall amount of hydroxyl groups and overall amount of halo groups is of 0.95 to 1.05, preferably of 0.99 to 1.01, more preferably of 0.995 to 1.005.

The alkali metal carbonate is preferably sodium carbonate, potassium carbonate, rubidium carbonate and cesium carbonate. Sodium carbonate and especially potassium carbonate are preferred. Mixtures of more than one carbonates can be used, for example, a mixture of sodium carbonate or bicarbonate and a second alkali metal carbonate or bicarbonate having a higher atomic number than that of sodium.

The amount of said alkali metal carbonate used, when expressed by the ratio of the equivalents of alkali metal (M) per equivalent of hydroxyl group (OH) [eq. (M)/eq. (OH)] ranges from about 1.0 to about 3.0, preferably from about 1.1 to about 2.5, and more preferably from about 1.5 to about 2.0, being understood that above mentioned hydroxyl group equivalents are comprehensive of those of the diol of formula (I), and, if present, of diol of formula (III).

Generally, after an initial heat up period, the temperature of the reaction mixture will be maintained in a range of advantageously from 100-280° C., preferably from 120 to 250° C. for about 0.5 to 50 hours, typically 5 to 40 hours.

The diol or alkali salt of the diol, the dihalocompound and all other optional components are dissolved or dispersed in a solvent mixture comprising an aprotic solvent, typically a polar aprotic solvent. If desired, an additional solvent can be used together with the aprotic solvent which forms an azeotrope with water, whereby water formed as a by-product during the polymerization may be removed by continuous azeotropic distillation throughout the polymerization.

The by-product water possibly formed during the polymerization can alternatively be removed using a controlled stream of an inert gas such as nitrogen or argon over the reaction mixture in addition to or in the absence of an azeotrope-forming solvent as described above.

Suitable polar aprotic solvents for use in the inventive process are for instance sulphur containing solvents known and generically described in the art as dialkyl sulfoxides and dialkylsulfones wherein the alkyl groups may contain from 1 to 8 carbon atoms, including cyclic alkylidene analogs thereof, can be mentioned. Specifically, among the sulphur-containing solvents that may be suitable for the purposes of this invention are dimethylsulfoxide (DMSO), dimethylsulfone, diphenylsulfone, diethylsulfoxide, diethylsulfone, diisopropylsulfone, tetrahydrothiophene-1,1-dioxide (commonly called tetramethylene sulfone or sulfolane) and tetrahydrothiophene-1-monoxide and mixtures thereof. Nitrogen-containing polar aprotic solvents, including dimethylacetamide (DMAc), dimethylformamide and N-methyl pyrrolidone (NMP) and the like have been disclosed in the art for use in similar processes, and may also be found useful in the practice of this invention. The use of NMP, DMSO, diphenylsulfone and sulfolane has been found advantageous when the diol is 2,2,4,4-tetramethyl-1,3-cyclobutanediol.

Suitable aprotic solvents, which are non polar, include aromatic hydrocarbons such as benzene, toluene, xylene, ethylbenzene, chlorobenzene and the like.

Typically, if the reaction is conducted at atmospheric pressure, the boiling temperature of the solvent selected usually limits the temperature of the reaction. The reaction may be conveniently carried out in an inert atmosphere, e.g., nitrogen, at atmospheric pressure, although higher or lower pressures may also be used.

After the desired molecular weight has been reached, the polymer may be treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

The poly(ether ketone) polymer can be recovered by methods well known and widely employed in the art such as, for example, coagulation, solvent evaporation and the like. The resulting poly(ether ketone) polymer may be isolated by devolatilization of the reaction mixture after separation of salts with or without first adding additional solvent(s) such as sulfolane or a mixture of sulfolane with another solvent, optionally an azeotrope forming solvent, to fully dissolve any polymer and cause the precipitation of the metal halide. Alternatively, the polymer may be isolated by precipitation and/or coagulation by contacting the reaction mixture with a non-solvent for the polymer such as an alcohol or water, or mixtures thereof. The precipitate/coagulate may be rinsed and/or washed with demineralized water prior to drying under reduced pressure and elevated temperature. The resulting precipitate may be further processed by extruding and pelletizing. The pelletized product may subsequently be subjected to further melt processing such as injection moulding and/or sheet extrusion. The conditions for moulding, extruding, and thermoforming the resulting poly(ether ketone) can be easily determined by a person skilled in the art.

The poly(ether ketone) polymer according to the present invention may be used in all common applications for poly(ether ketone) polymers known in the art. In addition, the diol of formula (I) used to prepare the poly(ether ketone) polymer according to the present invention does not show any endocrine activity and is therefore a suitable candidate for the preparation of polymers to be used in applications requiring contact with water, food, drugs and/or blood.

The poly(ether ketone) polymer according to the present invention may be used alone or in compositions that include at least one poly(ether ketone) polymer, and at least one other ingredient. Said other ingredient can be another polymer. It can also be a non polymeric ingredient such as a solvent, a filler, a lubricant, a mould release agent, an antistatic agent, a flame retardant, an anti-fogging agent, a matting agent, a pigment, a dye and an optical brightener. Therefore, another aspect of the present invention is thus related to a composition comprising the above described poly(ether ketone) polymer.

The polymer or the polymer composition of the present invention can notably be used for the manufacture of membranes, films and sheets, and three-dimensional moulded parts.

The poly(ether ketone) polymer can be advantageously converted into finished articles using conventional processing techniques, such as melt processing (including injection moulding, extrusion moulding, compression moulding), and solution processing. Non limiting examples of shaped articles which can be manufactured from the poly(ether ketone) polymer of the invention using different processing technologies are generally selected from the group consisting of melt processed films, solution processed films (porous and non porous films, including solution casted membranes, and membranes from solution spinning), melt process monofilaments and fibers, solution processed monofilaments, hollow fibers and solid fibers, and injection and compression molded objects.

Among membranes, the poly(ether ketone) polymer of the invention is particularly suitable for manufacturing membranes intended for contact with aqueous media.

Shaped articles manufactured from the poly(ether ketone) polymer can be, as above mentioned, under the form of films and sheets. These shaped articles are particularly useful as specialized optical films or sheets, and/or suitable for packaging.

Further, shaped articles manufactured from the poly(ether ketone) polymer of the invention can be three-dimensional moulded parts, in particular foamed parts. Among fields of use wherein such moulded parts can be used, mention can be made of healthcare field, aircraft and automotive applications.

A further object of the invention is thus directed to articles and shaped articles comprising the poly(ether ketone) polymer of the invention.

Should the disclosure of any patents, patent applications, and publications which are incorporated herein by reference conflict with the description of the present application to the extent that it may render a term unclear, the present description shall take precedence.

The invention will now be described with reference to the following examples, whose purpose is merely illustrative and not intended to limit the scope thereof

EXAMPLES

Example 1

Preparation of Poly(Ether Ketone) Polymer Consisting of Recurring Units of Formula (i)

Formula (i)

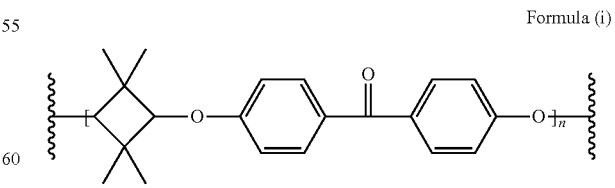

2,2,4,4-tetramethyl-1,3-cyclobutanediol (30 g, 0.208 moles), 4,4'-difluorobenzophenone (45.48 g, 0.208 moles), potassium carbonate (57.51 g, 0.416 moles) and 225 g sulfolane were charged to a 500 mL three-neck flask equipped with mechanical stirrer, nitrogen inlet/outlet, Barrett trap and condenser. The reaction mixture was placed in an oil bath at 150° C. with stirring and controlled nitrogen purge. The oil bath temperature was increased to 210° C. and held at this temperature for 17 hours. Heat was removed and the solution was diluted with 200 mL NMP. The reaction mixture was pressure filtered through a glass fiber filter to remove residual salts which yielded transparent polymer solution. The polymer solution was coagulated in a Waring blender containing equal amounts of water and methanol. The precipitate was isolated by vacuum filtration and washed twelve times with boiling water to remove residual potassium salts. A final wash with methanol and drying at 100° C. under reduced pressure afforded white polymer powder.

Example 2

Preparation of Poly(Ether Ketone) Polymer Comprising Recurring Units of Formula (i) and of Formula (ii) in 50:50 Molar Ratio Using a Strong Base in DMSO

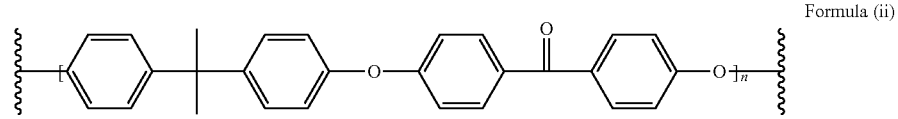

Formula (ii)

2,2,4,4-tetramethyl-1,3-cyclobutanediol (1.0 g, 6.9 mmol), bisphenol-A (1.58 g, 6.9 mmol), DMSO (3.5 g) and toluene (7.5 g) were charged to a 100 mL three-neck flask equipped with mechanical stirrer, nitrogen inlet/outlet, Barrett trap and condenser. The reaction mixture was heated to 40° C. on an oil bath at which time a 50% aqueous solution of sodium hydroxide (2.22 g, 27 mmol) was added dropwise followed by an additional 5 g DMSO. Oil bath temperature was increased until distillation of water and toluene was observed. Toluene was added until no water was seen in the Barrett trap and a yellow precipitate formed in the reaction flask. 4,4'-difluorobenzophenone (3.03 g, 14 mmol) in toluene (25 g) were added dropwise to the reaction mixture. Oil bath temperature was increased to 160° C. and reacted for 8 hours. Heat was removed and the solution diluted with 10 mL dimethylformamide. Workup of the resulting solution was the same as described in example 1.

Example 3

Preparation of Poly(Ether Ketone) Polymer Comprising Recurring Units of Formula (i) and of Formula (ii) in 50:50 Molar Ratio Using a Weak Base in Sulfolane 2,2,4,4-tetramethyl-1,3-cyclobutanediol (1.25 g, 8.7 mmol), bisphenol-A (1.98 g, 8.7 mmol), 4,4'-difluorobenzophenone (3.78 g, 17 mmol), potassium carbonate (4.8 g, 35 mmol) and 19 g sulfolane were charged to a 100 mL three-neck flask equipped with mechanical stirrer, nitrogen inlet/outlet, Barrett trap and condenser. The reaction mixture was placed in an oil bath at 150° C. with stirring and controlled nitrogen purge to remove water and carbon dioxide. The oil bath temperature was increased to 210° C. and held at this temperature for 21 hours until ideal viscosity was reached. Heat was removed and the solution was diluted with 20 mL NMP. Workup of the resulting solution was the same as described in example 1.

Example 4

Preparation of Poly(Ether Ketone) Polymer Comprising Recurring Units of Formula (i) and of Formula (iii) in 50:50 Molar Ratio Using a Weak Base in Sulfolane

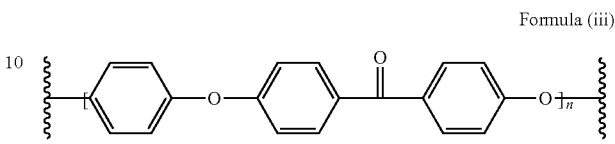

Formula (iii)

2,2,4,4-tetramethyl-1,3-cyclobutanediol (1.00 g, 6.9 mmol), hydroquinone (0.76 g, 6.9 mmol), 4,4'-difluorobenzophenone (3.0 .g, 14 mmol), potassium carbonate (2.21 g, 16 mmol) and 11 g sulfolane were charged to a 100 mL three-neck flask equipped with mechanical stirrer, nitrogen inlet/outlet, Barrett trap and condenser. The reaction mixture was placed in an oil bath at 150° C. with stirring and controlled nitrogen purge to remove water and carbon dioxide. The oil bath temperature was increased to 210° C. and held at this temperature for 18 hours until ideal viscosity was reached. Heat was removed and the solution was diluted with 20 mL NMP. Workup of the resulting solution was the same as described in example 1.

Example 5

Preparation of Poly(Ether Ketone) Polymer Comprising Recurring Units of Formula (i) and of Formula (iv) in 50:50 Molar Ratio Using a Weak Base in Diphenylsulfone

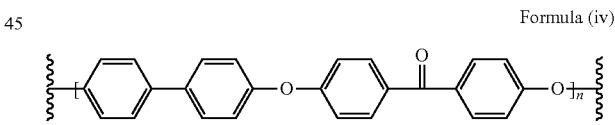

Formula (iv)

2,2,4,4-tetramethyl-1,3-cyclobutanediol (2.5 g, 17 mmol), 4,4'-biphenol (3.29 g, 17 mmol), 4,4'-difluorobenzophenone (7.57 .g, 35 mmol), potassium carbonate (9.58 g, 69 mmol) and 40 g diphenylsulfone were charged to a 100 mL three-neck flask equipped with mechanical stirrer, nitrogen inlet/outlet, Barrett trap and condenser. The reaction mixture was placed in an oil bath at 150° C. with stirring and controlled nitrogen purge to remove water and carbon dioxide. The oil bath temperature was increased to 270° C. and held at this temperature for 18 hours until ideal viscosity was reached. Heat was removed and the solution poured hot onto aluminium foil. Upon cooling the material was cut and ground on a Retsch ZM-200 centrifugal grinder. The ground material was washed twelve times with acetone to remove diphenylsulfone. Resulting material was washed three times with hot water to remove potassium salts. A final wash with methanol and drying at 100° C. under reduced pressure afforded white polymer powder.

Example 6

Preparation of Poly(Ether Ketone) Polymer Comprising Recurring Units of Formula (i) and of Formula (v) in 50:50 Molar Ratio Using a Weak Base in Sulfolane

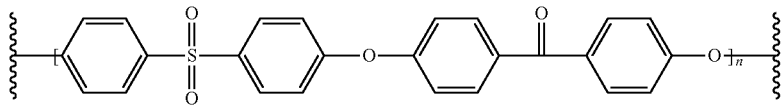

2,2,4,4-tetramethyl-1,3-cyclobutanediol (1.00 g, 7 mmol), bisphenol-S (1.74 g, 7 mmol), 4,4'-difluorobenzophenone (3.03 .g, 14 mmol), potassium carbonate (2.21 g, 16 mmol) and 13 g sulfolane were charged to a 100 mL three-neck flask equipped with mechanical stirrer, nitrogen inlet/outlet, Barrett trap and condenser. The reaction mixture was placed in an oil bath at 150° C. with stirring and controlled nitrogen purge to remove water and carbon dioxide. The oil bath temperature was increased to 210° C. and held at this temperature for 18 hours until ideal viscosity was reached. Heat was removed and the solution was diluted with 20 mL NMP. Workup of the resulting solution was the same as in example 1.

Example 7

Preparation of Poly(Ether Ketone) Polymer Comprising Recurring Units of Formula (vi) Using a Weak Base in Sulfolane

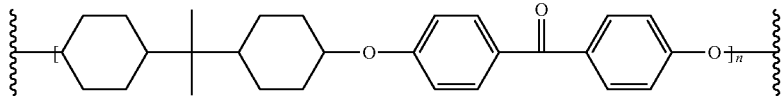

[4,4'-(propane-2,2-diyl)bis(cyclohexan-1-ol)] (10 g, 42 mmol), 4,4'-difluorobenzophenone (9.17 g, 42 mmol), potassium carbonate (11.50 g, 83 mmol) and 57.5 g sulfolane were charged to a 100 mL three-neck flask equipped with mechanical stirrer, nitrogen inlet/outlet, Barrett trap and condenser. The reaction mixture was placed in an oil bath at 150° C. with stirring and controlled nitrogen purge to remove water and carbon dioxide. The oil bath temperature was increased to 215° C. and held at this temperature for 32 hours until ideal viscosity was reached. Heat was removed and the solution was diluted with 40 mL NMP. Workup of the resulting solution was the same as described in example 1.

Comparative Example 1

Preparation of Poly(Ether Ketone) Polymer Comprising Recurring Units of Formula (vii) Using a Weak Base in Sulfolane

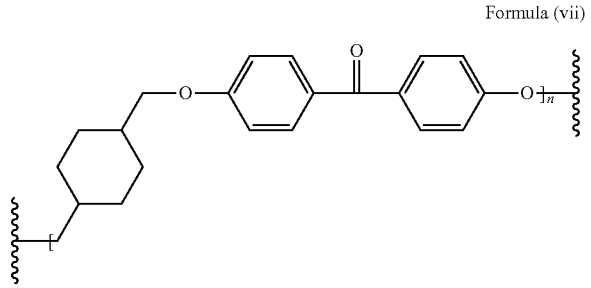

1,4-cyclohexanedimethanol (6.00 g, 42 mmol), 4,4'-difluorobenzophenone (9.17 g, 42 mmol), potassium carbonate (11.50 g, 83 mmol) and 45.5 g diphenylsulfone were charged to a 100 mL three-neck flask equipped with mechanical stirrer, nitrogen inlet/outlet, Barrett trap and condenser. The reaction mixture was placed in an oil bath at 150° C. with stirring and controlled nitrogen purge to remove water and carbon dioxide. The oil bath temperature was increased to 250° C. and held at this temperature for 18 hours until ideal viscosity was reached. Workup of the resulting solution was the same as described in example 5.

Comparative Example 2

The polymers of examples 1-7 were compared to KetaSpire® PEEK KT-820, a poly(ether ether ketone) commercially available from Solvay Specialty polymers, L.L.C.

Properties of the Polymers

The melt and glass transition temperatures of the different polymers were measured according to ASTM D3418 using a TA Instruments Model Q20/Q1000 Differential Scanning calorimeter and Liquid Nitrogen Cooling System operated with TA Thermal Advantage and Universal Analysis software. The instrument was calibrated using a heating and cooling rate of 20° C./min in nitrogen atmosphere. The measurements were also carried out using a heating and cooling rate of 20° C./min in nitrogen atmosphere.

The degradation temperature (Td) of the invented polymer can be measured by a technique known to those skilled in the art as Thermo Gravimetric Analysis (TGA). Precisely, a TA Instruments Q500 TGA was used to measure the degradation temperature of the polymer per ASTM E1131 and D3850. For this purpose, it was checked that the TGA was well-calibrated by means of a calibration sample. Then, the polymers were submitted to the following cycle: heating from room temperature up to 800° C. at a rate of 10° C./min in nitrogen atmosphere. As the polymer was heated, weight loss of the sample was monitored. The 5% decomposition temperature (Td5%) represents the temperature at which a 5% loss in weight of the sample was observed.

The molecular weight was measured using GPC. Size Exclusion Chromatography (SEC) was performed using methylene chloride as a mobile phase. Two 5 micron mixed D Size Exclusion Chromatography (SEC) columns with guard column from Agilent Technologies were used for separation. An ultraviolet detector of 254 nm was used to obtain the chromatogram. A flow rate of 1.5 ml/min and injection volume of 20 µl of a 0.2% w/v solution in mobile phase was selected. The calibration was performed using 10 narrow calibration standards of Polystyrene obtained from Agilent Technologies (with a peak molecular weight ranging from 580 to 371000) (Calibration Curve: 1) Type: Relative, Narrow calibration standard calibration 2) Fit: $3^{rd}$ order regression). The acquisition of the data, integration of the peaks and calculation was carried out using the Empower Pro GPC software manufactured by Waters. The peak integration start and end points were manually determined from significant difference on global baseline.

The molecular weight and the thermal properties of the polymers of E1 to E7 as well as the polymers of CE1 and CE2 are summarized in Table 1. As one may read from the table below, the Tg of the polymers of E1 to E7 are all above 140° C. and the 5% decomposition temperature are ranging from 383 to 465° C., which indicates the high thermal resistance of the poly(ether ketone) polymers of the present invention.

TABLE 1

Molecular weight and thermal properties of the polymers obtained

| Example | Diols | Mw (kDa) | Tg (° C.) | Tm (° C.) | Td5% (° C.) |
|---|---|---|---|---|---|
| E1 | CBDO | 108 | 161 | N/A | 402 |
| E2 | CBDO/Bis-A | 101 | 178 | N/A | 445 |
| E3 | CBDO/Bis-A | 74 | 154 | N/A | 434 |
| E4 | CBDO/HQ | 25 | 144 | N/A | 428 |
| E5 | CBDO-BP | 44 | 154 | 364 | 465 |
| E6 | CBDO/Bis-S | 85 | 187 | N/A | 403 |
| E7 | HBPA | 20 | 145 | N/A | 383 |
| CE1 | CHDM | 48 | 135 | 284 | 383 |
| CE2 | HQ | 80-120 | 150 | 340 | — |

The UV stability of the polymers E1 and CE2 were assessed by carrying out weathering experiments and comparing the samples before and after exposure to UV light. To this aim, a film of polymer E1 was obtained by solvent casting. An Ajedium™ amorphous film of the CE2 polymer (KetaSpire® PEEK KT-820) was obtained from commercially available from Solvay Specialty polymers, L.L.C.

The weathering experiments were carried out in 24 hour increments for up to 5 days in an Atlas ci4000 Xenon weather-o-meter, which was also equipped with a Type "S" borosilicate inner filter and a soda lime outer filter. The cut-off filters eliminated all wavelengths above 340 nm. All weathering cycles were set to an irradiance of 0.30 w/m², with a panel temperature of 55° C., a chamber temperature of 38° C., and a relative humidity of 55%. All other variables were controlled in accordance with ASTM G155-4.

Following exposure to UV, each film was subsequently placed in a Perkin Elmer Lamda 950 UV Vis spectrophotometer set to transmission mode and the UV-Vis spectra was collected.

Table 2 summarizes the percentage of light transmission retention at 425 nm of the films, after 1, 3 and 5 days of exposure.

TABLE 2

Comparison of the UV stability of the polymers E1 and CE2

| Days of exposure to UV light | Percentage of light transmission retention at 425 nm (%) | |
|---|---|---|
| | E1 | CE2 |
| 1 | 99 | 99 |
| 3 | 94 | 86 |
| 5 | 89 | 78 |

The mechanical properties of the polymers E1 and CE2 were measured on molded type 5 tensile bars. The mechanical properties of the examples and comparative examples are summarized in the Table 3.

TABLE 3

Comparison of the Mechanical Properties of the polymers E1 and CE2

| | Method | Units | E1 | CE2 |
|---|---|---|---|---|
| Notched Izod | ASTM D256 | (J/m) | 217 | 91 |
| Tensile Modulus Elasticity | ASTM D638 | (MPa) | 2454 | 3500 |
| Tensile Elongation at Yield | ASTM D638 | (%) | 7.5 | 5.2 |
| Tensile Strength at Yield | ASTM D638 | (MPa) | 62 | 95 |

The polymer of the present invention (E1) feature an outstanding balance of properties including a very high impact strength and a very good tensile elongation properties, a high thermal resistance and stability accompanied with an improved resistance to UV when compared to commercially available PEEK (CE2).

The poly(ether ketone) polymer of the present invention are thus very well suited for the manufacture of articles where their excellent properties are valued.

The invention claimed is:

1. A poly(ether ketone) polymer comprising recurring units of formula (PEK-1):

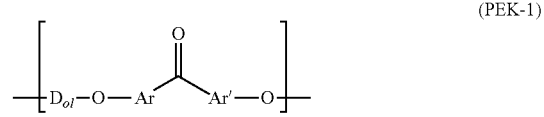

(PEK-1)

wherein:

$D_{ol}$ is selected from the group consisting of formulae (Dol-1), (Dol-2), (Dol-3), (Dol-4) and (Dol-5):

Dol-1

Dol-2

Dol-3

Dol-4

Dol-5

Ar and Ar' are aromatic moieties, independently selected from the group consisting of formulae (Ar-1), (Ar-2), (Ar-3), (Ar-4) and (Ar-5):

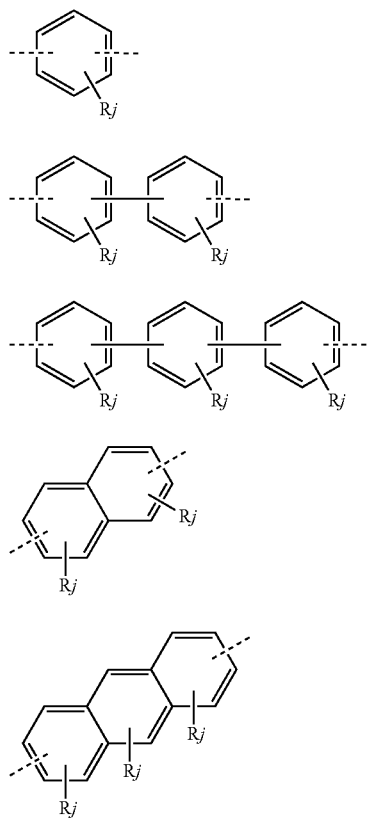

wherein each R, equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and j is zero or is an integer from 0 to 4.

2. The poly(ether ketone) polymer according to claim 1, wherein the poly(ether ketone) polymer comprises recurring units selected from the group consisting of recurring units of formulae (i) to (vi), and mixtures thereof:

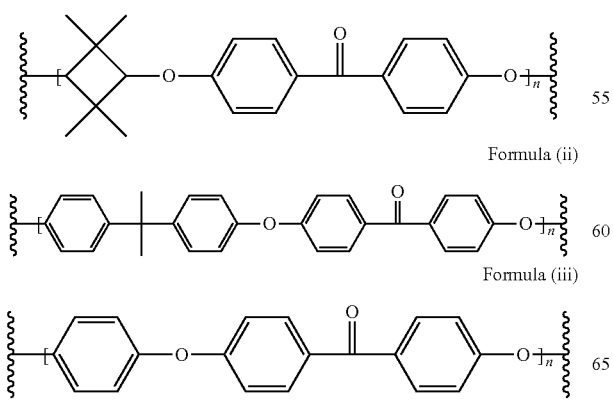

3. The poly(ether ketone) polymer according to claim 1, wherein the poly(ether ketone) polymer comprises recurring units from a reaction of at least one diol of general formula (I):

HO-Dol-OH    (I)

wherein said diol is selected from the group consisting of diols of formulae (D-1) to (D-5):

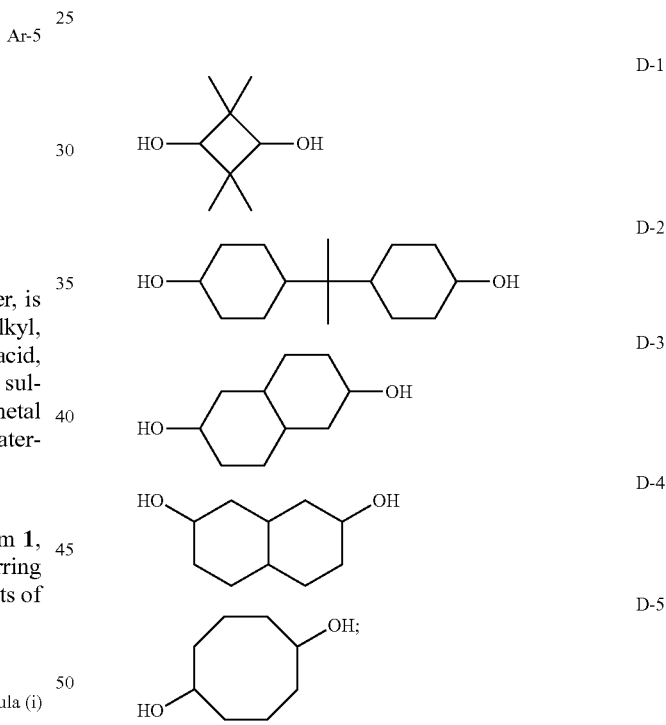

and at least one aromatic dihalocompound of general formula (II):

wherein the Ar and Ar' are aromatic moieties, independently selected from the group consisting of formulae (Ar-1), (Ar-2), (Ar-3), (Ar-4) and (Ar-5); and X and X', equal to or different from each other, are independently a halogen atom.

4. The poly(ether ketone) polymer according to claim 3, wherein the at least one diol is 2,2,4,4-tetramethyl-1,3-cyclobutanediol of formula (D-1).

5. The poly(ether ketone) polymer according to claim 3, wherein the at least one aromatic dihalocompound is 4,4'-difluorobenzophenone.

6. The poly(ether ketone) polymer according to claim 3 further comprising recurring units from an aromatic diol of formula (III):

HO-AD$_{ol}$-OH         (III)

wherein AD$_{ol}$ is an aliphatic or aromatic group comprising from 4 to 30 carbon atoms, optionally comprising heteroatoms, which is different from D$_{ol}$.

7. The poly(ether ketone) polymer according to claim 6, wherein AD$_{ol}$ in formula (III) is selected from the group consisting of formulae (ADol-1) to (ADol-6):

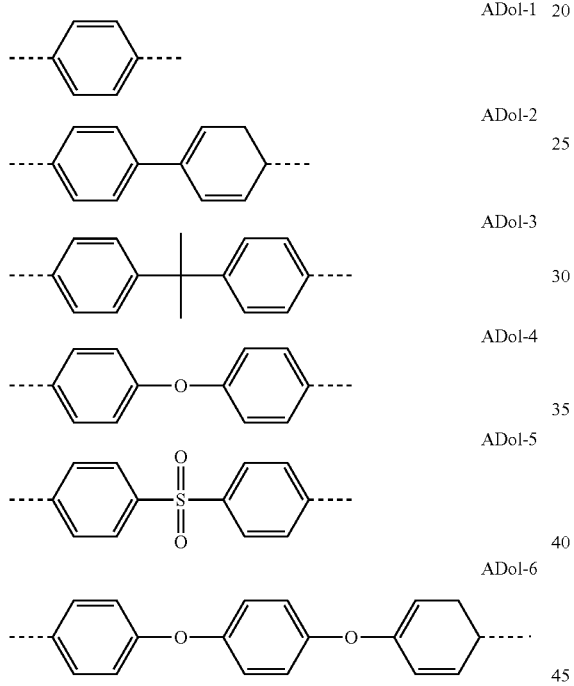

8. The poly(ether ketone) polymer according to claim 3, wherein the recurring units from the diol of formula (I) and the aromatic dihalocompound of formula (II) are at least 40 mol % of the total amount of recurring units.

9. A method of preparing the poly(ether ketone) polymer according to claim 3 which comprises reacting in a solvent mixture comprising a polar aprotic solvent: at least one alkali salt of the diol of formula (I); and at least one aromatic dihalocompound of the formula (II), wherein said alkali salt of the diol and said aromatic dihalocompound are reacted in a substantially equimolar amount.

10. A method of preparing the poly(ether ketone) polymer according claim 3 which comprises reacting in a solvent mixture comprising a polar aprotic solvent: the at least one diol of formula (I); and the at least one aromatic dihalocompound of formula (II); said diol and said aromatic dihalocompound being reacted in a substantially equimolar amount, in the presence of an alkali metal carbonate.

11. The method according to claim 9 additionally reacting in said solvent mixture at least one of: one diol of formula (III) or its alkali salt, which is different from the diol of formula (I), HO-AD$_{ol}$-OH         (III)

wherein AD$_{ol}$ is an aliphatic or aromatic group comprising from 4 to 30 carbon atoms, optionally comprising heteroatoms, which is different from D$_{ol}$; and/or
one dihalocompound of formula (IV), which is different from the aromatic dihalocompound of formula (II),

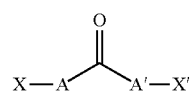         (IV)

wherein A and A' are aliphatic or aromatic groups, which are different from Ar and Ar', having from 4 to 30 carbon atoms, optionally comprising heteroatoms; and
X and X', equal to or different from each other, are independently a halogen atom.

12. The method according to claim 10 additionally reacting in said solvent mixture at least one of: one diol of formula (III) or its alkali salt, which is different from the diol of formula (I), HO-AD$_{ol}$-OH         (III)

wherein AD$_{ol}$ is an aliphatic or aromatic group comprising from 4 to 30 carbon atoms, optionally comprising heteroatoms, which is different from D$_{ol}$; and/or
one dihalocompound of formula (IV), which is different from the aromatic dihalocompound of formula (II),

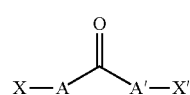         (IV)

wherein A and A' are aliphatic or aromatic groups, which are different from Ar and Ar', having from 4 to 30 carbon atoms, optionally comprising heteroatoms; and
X and X', equal to or different from each other, are independently a halogen atom.

13. A composition comprising the poly(ether ketone) polymer of claim 1.

14. An article comprising the poly(ether ketone) polymer of claim 1.

* * * * *